(12) United States Patent
Ludtke

(10) Patent No.: US 6,460,030 B1
(45) Date of Patent: Oct. 1, 2002

(54) METHOD AND SYSTEM FOR SEARCHING THROUGH DESCRIPTIVE DATA IN THE AV/C PROTOCOL

(75) Inventor: Harold Aaron Ludtke, San Jose, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 0 days.

(21) Appl. No.: 09/258,046

(22) Filed: Feb. 25, 1999

Related U.S. Application Data

(60) Provisional application No. 60/077,276, filed on Mar. 9, 1998.

(51) Int. Cl.<sup>7</sup> .............................................. G06F 17/30
(52) U.S. Cl. .............................. 707/3; 707/100; 710/10
(58) Field of Search ................................ 707/205, 200, 707/3, 10, 100; 700/1, 83; 709/216; 710/10

(56) References Cited

U.S. PATENT DOCUMENTS

| | | | | |
|---|---|---|---|---|
| 5,101,494 A | * | 3/1992 | Bilski et al. ................... | 717/4 |
| 5,202,985 A | * | 4/1993 | Goyal ........................... | 707/4 |
| 5,535,372 A | * | 7/1996 | Benchase et al. ............. | 703/23 |
| 5,745,109 A | | 4/1998 | Nakano et al. ............... | 345/340 |
| 5,787,259 A | | 7/1998 | Haroun et al. ............... | 709/253 |
| 5,809,331 A | | 9/1998 | Staats et al. .................. | 710/10 |
| 5,829,050 A | * | 10/1998 | Maeda ......................... | 711/171 |
| 6,118,924 A | * | 9/2000 | Nakatani et al. ............. | 386/70 |
| 6,148,241 A | * | 11/2000 | Ludtke et al. ................ | 700/83 |
| 6,173,422 B1 | * | 1/2001 | Kimura et al. ................ | 714/57 |
| 6,178,414 B1 | * | 1/2001 | Beckmann et al. ............ | 707/3 |

\* cited by examiner

*Primary Examiner*—Greta L. Robinson
(74) *Attorney, Agent, or Firm*—Wagner Murabito & Hao LLP

(57) ABSTRACT

A system and method of same for performing a search of stored data in a network of electronic devices connected by a network bus, wherein at least one of the electronic devices is a target device containing the stored data and another one of the electronic devices is a controller device. In one embodiment, the electronic devices are compliant with audio visual control (AV/C) protocol and the network is compliant with IEEE 1394. In accordance with the present invention, search criterion are specified in a command structure transmitted from the controller device to the target device. The target device recognizes the command as a request to perform the search of the stored data and executes the command, thereby causing the search to be performed. As a result of a successful search, data on the target device that satisfy the search criterion are identified and an identifier locating that data is also specified. The target device transmits a response containing the identifier to the controller device. The identifier provides sufficient information for locating the discovered data so that it can be subsequently accessed and retrieved by the controller device. Thus, the present invention accomplishes the search on the target device containing the stored data and only a relatively small amount of data is transmitted over the network bus, thus consuming only a small portion of the available bandwidth capacity of the bus and improving overall network performance.

42 Claims, 13 Drawing Sheets

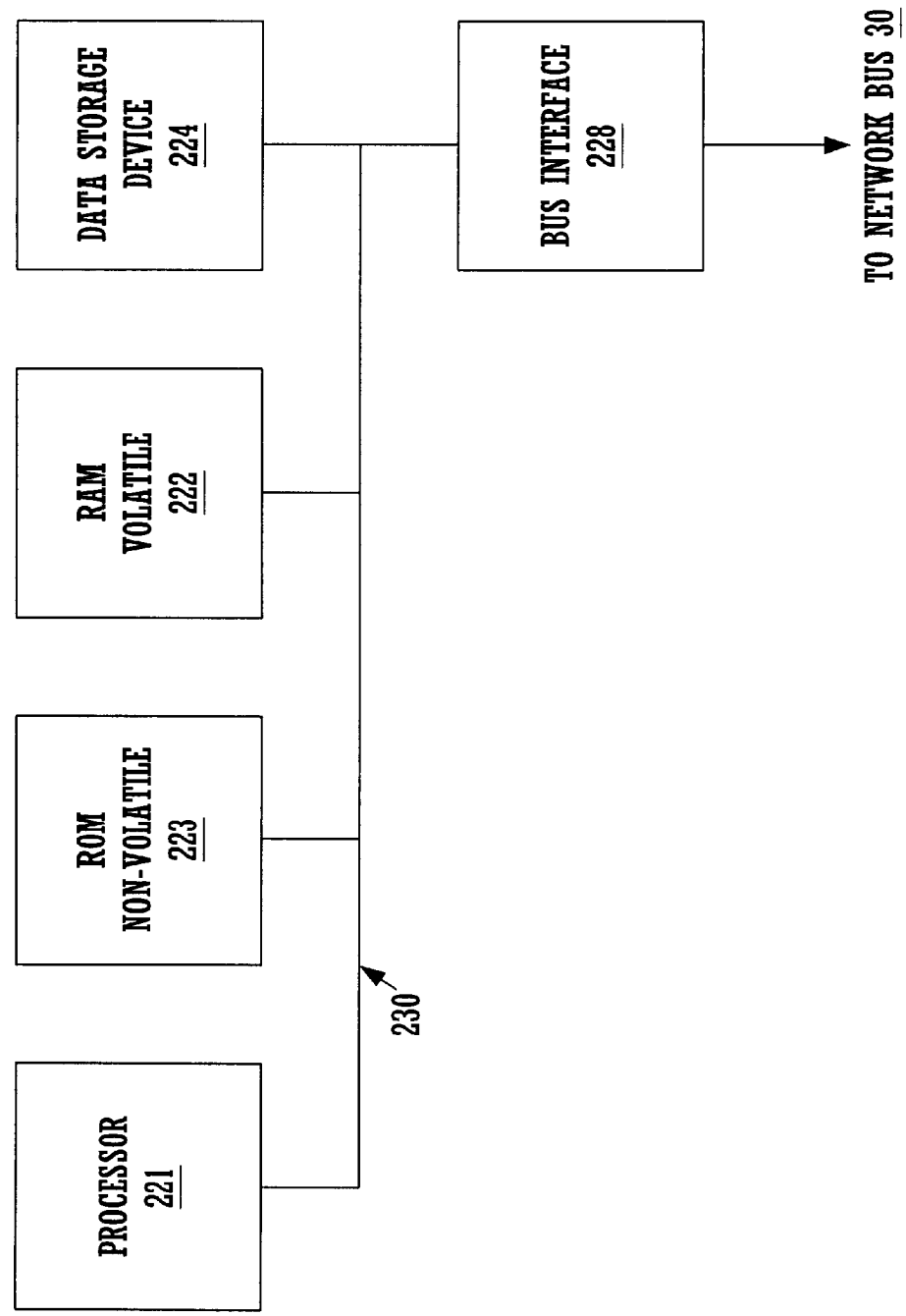

300

```
┌─────────────────────────────────────────────────┐
│ USER IDENTIFIES SEARCH ITEM VIA GRAPHICAL USER  │
│      INTERFACE WITH CONTROLLER DEVICE           │
│                    305                          │
└─────────────────────────────────────────────────┘
                        ↓
┌─────────────────────────────────────────────────┐
│ SEARCH ITEM SPECIFIED AS SEARCH CRITERIA IN A   │
│      COMMAND STRUCTURE ON CONTROLLER DEVICE     │
│                    310                          │
└─────────────────────────────────────────────────┘
                        ↓
┌─────────────────────────────────────────────────┐
│ CONTROLLER DEVICE TRANSMITS COMMAND STRUCTURE   │
│              TO TARGET DEVICE(S)                │
│                    315                          │
└─────────────────────────────────────────────────┘
                        ↓
┌─────────────────────────────────────────────────┐
│ TARGET DEVICE(S) RECOGNIZE COMMAND STRUCTURE    │
│       AS SEARCH REQUEST AND EXECUTE SEARCH      │
│                    320                          │
└─────────────────────────────────────────────────┘
                        ↓
┌─────────────────────────────────────────────────┐
│ TARGET DEVICE(S) IDENTIFY DATA SATISFYING       │
│  SEARCH CRITERIA AND IDENTIFIER ASSOCIATED      │
│                 WITH DATA                       │
│                    325                          │
└─────────────────────────────────────────────────┘
                        ↓
┌─────────────────────────────────────────────────┐
│  IDENTIFIER TRANSMITTED FROM TARGET DEVICE(S)   │
│             TO CONTROLLER DEVICE                │
│                    330                          │
└─────────────────────────────────────────────────┘
                        ↓
┌─────────────────────────────────────────────────┐
│ IDENTIFIER CAN BE SUBSEQUENTLY USED TO ACCESS   │
│      DATA THAT SATISFIED SEARCH CRITERIA        │
│                    335                          │
└─────────────────────────────────────────────────┘
                        ↓
┌─────────────────────────────────────────────────┐
│        DATA RETRIEVED FROM TARGET DEVICE        │
│                    340                          │
└─────────────────────────────────────────────────┘
```

| | msb                                                              lsb |
|---|---|
| opcode | SEARCH DESCRIPTOR (0B) |
| operand[0] | search_for (03) length |
| operand[1] | (4E) "N" |
| operand[2] | (48) "H" |
| operand[3] | (4B) "K" |
| operand[4] | search_in (06) length |
| operand[5] | (10) type: search in specified fields |
| operand[6] | (12) in lists with specifid list_type field |
| operand[7] | (82) list_type: service |
| operand[8] | (2F) search in any objects in lists |
| operand[9] | (00) offset address... |
| operand[10] | (19)...search for service_name field |
| operand[11] | start_point (00) not specified - subunit chooses |
| operand[12] | direction (00) not specified - subunit chooses |
| operand[13] | response_format (21) return data as object_ID reference |
| operand[14] | status (FF) |

FIGURE 6

METHOD AND SYSTEM FOR SEARCHING THROUGH DESCRIPTIVE DATA IN THE AV/C PROTOCOL

RELATED US APPLICATION

This application claims priority to the now abandoned provisional patent application, Ser. No. 60/077,276, entitled "Method for Searching Through Descriptive Data in the AV/C Protocol," with filing date Mar. 9, 1998, and assigned to the assignee of the present application.

BACKGROUND OF THE INVENTION

1. Field of the Invention

The present invention relates to the field of consumer electronic devices coupled in an audio/visual network. More specifically, the present invention pertains to a system and method for performing a search through data stored in electronic devices in the network.

2. Background Art

The typical audio/visual (AV) system consists of a variety of consumer electronic devices that present and record AV media in different ways. For instance, the typical AV equipment found in a home includes a number of components such as a radio receiver or tuner, a compact disk (CD) player and/or a digital video disc player (DVD), a number of speakers, a television, a video cassette recorder (VCR), a tape deck, and the like, and also may include a personal computer (PC). The consumer electronic devices in the AV system are interconnected in some manner, typically by wires.

Consumer electronic devices have become more capable and more complex, and the demand for the latest and most capable devices has increased. As new devices emerge and become popular, the devices are purchased by consumers and "plugged" into their home or office AV systems. In turn, the conventional AV system paradigm is being replaced with a home or office AV network architecture for networking consumer electronic devices. The AV network architecture provides a powerful platform on which device functionality and interoperability can be built, and is capable of taking advantage of the increased sophistication that is being incorporated into consumer electronic devices.

A communication standard, the IEEE 1394 standard, has been defined for networking consumer electronic devices using a standard communication protocol layer (e.g., the audio visual control [AV/C] protocol). The IEEE 1394 standard is an international standard for implementing an inexpensive high-speed serial bus architecture which supports both asynchronous and isochronous format data transfers. The IEEE 1394 standard provides a high-speed serial bus for interconnecting digital devices, thereby providing universal input/output connection. The IEEE 1394 standard defines a digital interface for applications, thereby eliminating the need for an application to convert digital data to an analog form before it is transmitted across the bus. Correspondingly, a receiving application will receive digital data, not analog data, from the bus and will therefore not be required to convert analog data to digital form. The IEEE 1394 standard is ideal for consumer electronics communication in part because devices can be added to or removed from the serial bus while the bus is active.

At least one of the devices in the AV network functions as a controller device; for example, the tuner, a PC, or an intelligent controller device such as a set-top-box. The controller device has a number of specific inputs for coupling to the other consumer electronic devices on the AV network, referred to as target devices. The controller device has a corresponding number of control buttons or control switches which provide a limited degree of controllability and interoperability for the target devices. A user controls the AV system and the target devices by manipulating the buttons and switches on the front of the central component or, alternatively, by manipulating buttons on a hand-held remote control unit. In other implementations of AV networks, such as a network of devices compliant with the home audio/visual interoperability (HAVI) architecture, the target devices provide on-screen display (OSD) controls that are presented to the user on a screen or via speakers of the controller device.

The target devices in the AV network store their content and/or broadcast services using some method or model that provides a hierarchical set of data structures. One example of such a model is the AV/C object list model described in the patent application entitled "Method and Apparatus for Representing Devices and Available Information within a Network of Devices Using Object List and Object Entries," by Harold Aaron Ludtke, Ser. No. 09/040,540, now U.S. Pat. No. 6,260,063, filed Mar. 17, 1998, assigned to the assignee of the present invention and herein incorporated by reference. In the AV/C object list model, an object is used to represent a distinct entity on the target device, such as a particular track on a compact disk or a particular compact disk loaded into a CD changer that holds multiple CDs. An object list is a list of the objects, such as a list of all CDs in the CD changer.

One problem with an AV network is associated with the maximum bandwidth capacity of the network bus. That is, there is a maximum rate at which the network bus can carry data, typically measured in megabits/second. Each device on the AV network consumes a certain amount of the bandwidth capacity when the device is transmitting data, thereby reducing the bandwidth available for other devices to use at the same time.

In an AV network, particularly a distributed network where the target devices operate primarily as peers, a controller device may need to find, access, and retrieve data from one or more of the target devices. A significant disadvantage to the prior art is that, in order to find specific instances of data that describe the content available from a target device (e.g., descriptive data that corresponds to an object or object list), the controller device first retrieves most or all of the data from the target device. The data must first be transferred across the network bus from the target device to the controller device. The controller device then has to examine all of the data that was stored on the target device. For example, to find whether a particular compact disk is located in a CD changer that holds multiple disks, in the prior art it is necessary for the controller device to retrieve all titles from the target device (the CD changer). The controller device then must parse through all of that data to find the particular title being sought. In instances other than this one, even greater amounts of data may need to be retrieved and searched. Thus, in the prior art, a huge burden is placed on the overall network, the controller device, and the target device by the prior art search method described above. In particular, a large burden is placed on the bus, which must message all the data between the target device and the controller device.

The prior art is problematic because network traffic is significantly increased owing to the large amounts of data that need to be transferred over the network bus whenever a search of the descriptive data is requested. As such, the available bandwidth of the bus is substantially reduced and is thus not fully available for other functions. According to the IEEE 1394 standard, bandwidth is divided into isochronous and asynchronous portions. The isochronous portion of the bandwidth is guaranteed for those devices that successfully reserve the necessary bandwidth. However, this guarantee is at the expense of asynchronous data transfers because these types of transfers by their nature are not guaranteed to be performed by any specific time. Thus, when asynchronous traffic over the bus is heavy, all asynchronous transactions can incur delays. For example, the transmission of OSD data from target devices to controller devices could be delayed, which is manifested to the user as slow screen updates or poor animation quality. Thus, in the prior art, one function of the AV network may be temporarily subverted due to the heavy traffic associated with the search function. Certainly, the number of other simultaneous functions that can be supported by the AV network is reduced when descriptive data are being transferred over the network bus.

In addition, the prior art is problematic because the controller device is required to acquire and then search through large amounts of descriptive data to find the object of interest. The controller device typically is limited in its capability to process and store data. Consequently, the central processor and other resources of the controller device are taxed by the prior art search method, and are diverted from their main function of managing the real-time user interface and controlling the network and the target devices. Thus, the controller device may not be responsive to the user, and displays, images, etc., provided as part of the graphical user interface may be delayed or slowed. In addition, the controller device must be designed and manufactured with increased capabilities such as a faster processor or more memory in order to support the prior art search method, increasing the cost of the controller device for the consumer.

Similarly, a disadvantage to the prior art is that the performance of the target device is also negatively impacted. In most target devices, descriptive data are not necessarily stored in a convenient location for quick access and according to the format required by the controller device for the search. Typically, it is necessary for the target device to first gather the information it has available and assemble that information to compile the necessary descriptive data. Then, the target device must translate the various data formats and package the descriptive data in the format expected by the controller device. Thus, the prior art is problematic because it consumes the resources available in the target device. As above, the processing capability of the target device can be taxed by the prior art search method in order to send data over the network bus to the controller device. Because the target device must be designed with increased capabilities in order to support the prior art search method, the cost to the consumer is also increased.

Another problem in the prior art is associated with the continuous evolution and improvements occurring with regard to AV networks. For example, some target devices employing general purpose hard disks or other mass storage devices may be designed to record data without regard to or specific knowledge of the type of data being recorded. Thus, there may exist a class of devices that will not have the capability to create the descriptive data in a format that is compatible with that required. for the controller device to determine what is stored on the target device.

Accordingly, what is needed is a method and/or system that provides the capability to perform a search of the descriptive data stored on target devices but reduces traffic over the network bus, thereby improving overall network performance. What is further needed is a method and/or system for searching the descriptive data that addresses the above need and reduces the above described burdens placed on the target devices and on the controller device, thus improving the overall performance of these devices while obviating the need to build in costly performance enhancements; such as more powerful central processors and larger memories, to support the search function. In addition, what is needed is a search method and/or system that addresses the above needs and is also expected to be compatible with the changes and improvements made to AV networks in the future.

SUMMARY OF THE INVENTION

The present invention includes a method and system that provides the capability to perform a search of the descriptive data stored on target devices but reduces the traffic over the network bus, thereby improving overall network performance. The present invention also provides a method and system for searching the descriptive data that accomplishes the above and reduces the burdens placed on the target devices and on the controller device, thus improving the overall performance of these devices while obviating the need to build in costly performance enhancements, such as more powerful central processors and larger memories, to support the search function. In addition, the present invention provides a search method and system that accomplishes the above and is also expected to be compatible with future implementations of AV networks. These and other advantages of the present invention not specifically mentioned above will become clear within discussions of the present invention presented herein.

The present invention is a system and method of same for performing a search of stored data in a network of electronic devices connected by a network interface such as a bus, wherein at least one of the electronic devices is a target device containing the stored data and another one of the electronic devices is a controller device. First, search criterion are specified in a command structure and the command structure is transmitted from the controller device to the target device over the network bus. The target device recognizes the command structure as a request to perform the search of the stored data and executes the command structure, thereby causing the search to be performed. As a result of a successful search, data on the target device that satisfy the search criterion are identified and an identifier corresponding to that data is also specified. The target device transmits a response containing the identifier to the controller device over the network interface. The identifier provides sufficient information to allow the discovered data to be subsequently accessed and retrieved by the controller device. The identifier also enables the controller device to access and retrieve the content/broadcast service data (e.g., an object) that is described by the data that satisfy the search criteria.

In one embodiment, the electronic devices are compliant with AV/C (audio visual control) protocol, and the network and the network interface are compliant with the IEEE 1394 communication standard.

The present invention performs the search on the target device which contains the stored data and not on the controller device. Consequently, only a relatively small amount of data is transmitted over the network interface, thus consuming only a small portion of the available bandwidth capacity of the network interface and improving overall network performance. Additionally, the controller device is not burdened with the time-consuming task of searching through a large amount of data in order to find the data of interest. Likewise, the target devices are not burdened by having to process, translate and format a large amount of data in order to prepare that data to be transferred to the target device.

In the present embodiment, the search criterion specified in the command can include the search subject, a location for the search, a starting point for the search, and/or a direction of the search. Similarly, the format for the identifier provided in the response can include the address of the data that satisfies the search criterion, a position of an object described by that data, an identifier of the object, a list containing the object, and/or a type of list containing the object. The present invention allows a search to be specified and conducted based on criteria which do not require the storage device (e.g., the hard drive) to understand the structure of the descriptive data. This flexibility and other features of the present invention are expected to allow the present invention to remain compatible and useful even after changes and improvements are made to AV networks.

BRIEF DESCRIPTION OF THE DRAWINGS

FIG. 2B is a block diagram of one embodiment of a target device used in accordance with the present invention.

FIG. 3 is a flow chart of one embodiment of the process used by the controller device to perform a search of descriptive data in accordance with, the present invention.

FIG. 6 is an exemplary command structure for requesting a search of descriptive data in accordance with one embodiment of the present invention.

DETAILED DESCRIPTION OF THE INVENTION

Figure 1:
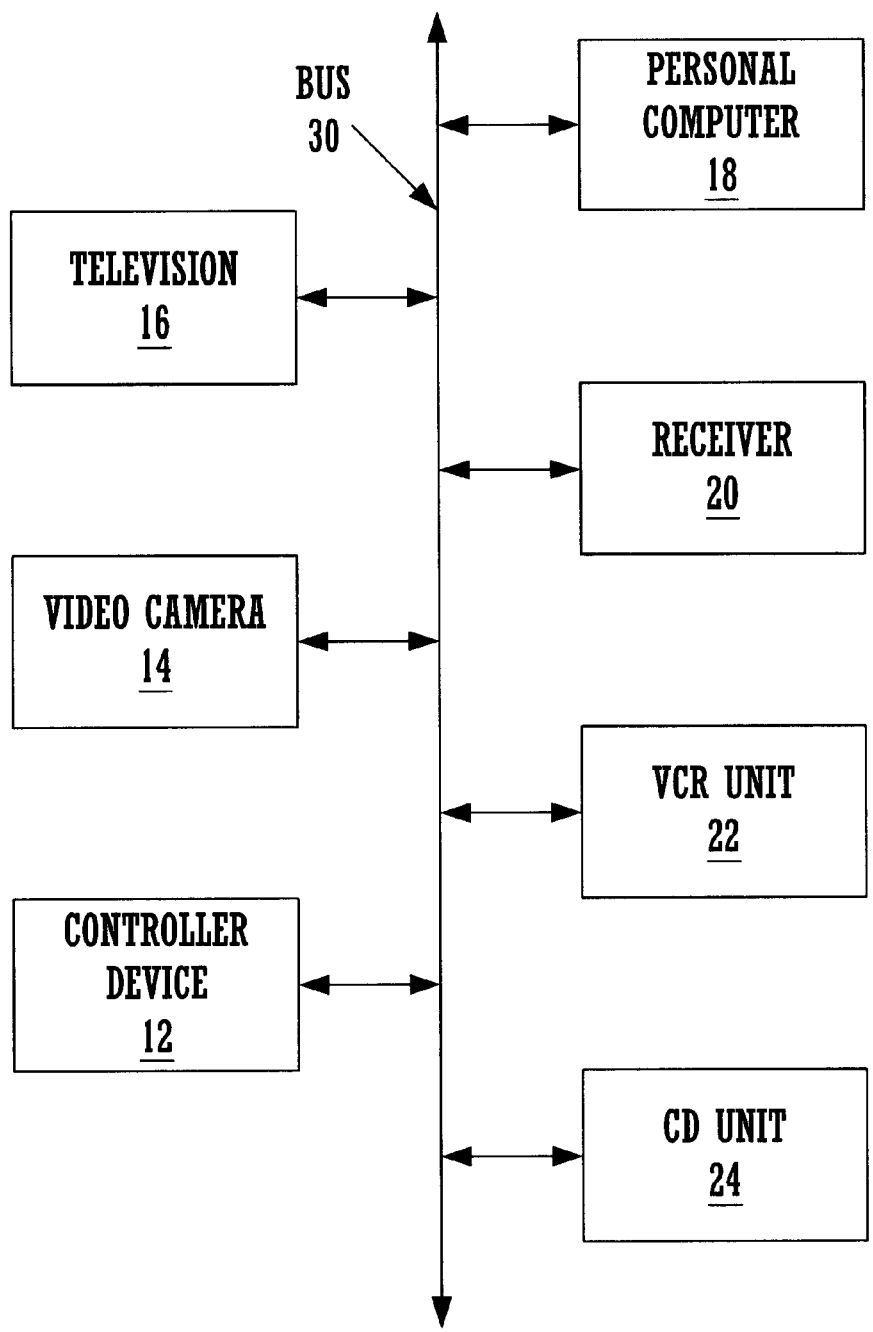
FIG. 1 illustrates an exemplary audio/visual network upon which embodiments of the present invention may be practiced.

In the following detailed description of the present invention, a method and system for searching through descriptive data in the AV/C protocol, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

Notation and Nomenclature

Some portions of the detailed descriptions which follow are presented in terms of procedures, logic blocks, processing, and other symbolic representations of operations on data bits within an intelligent electronic media device. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a consumer electronic media device. For reasons of convenience, and with reference to common usage, these signals are referred to as bits, values, elements, symbols, characters, terms, numbers, or the like with reference to the present invention.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussions, it is understood that throughout discussions of the present invention, discussions utilizing terms such as "processing" or "computing" or "generating" or "calculating" or "determining" or "displaying" or the like, refer to the action and processes (e.g., process 300 of FIG. 3) of a consumer electronic device, or similar electronic computing device (e.g., dedicated or embedded computer system), that manipulates and transforms data. The data are represented as physical (electronic) quantities within the consumer electronic device's registers and memories and is transformed into other data similarly represented as physical quantities within the consumer electronic device memories or registers or other such information storage, transmission, or display screens.

Current and proposed technologies allow consumer electronic devices to be connected in a home or office network and to transfer audio information, video information and other data to each other over a network bus. For the discussion herein, terms such as "consumer electronic device" and "network" are not limited to any form or type of device nor to any type of distribution network or data format. For the discussion herein, the present invention is discussed in the context of a home network comprising familiar consumer electronic devices interconnected by hardware using a serial bus and communicating via a standard protocol.

Distributed Audio Visual Network

FIG. 1 illustrates an exemplary network 10 that can support embodiments of the present invention. Network 10 comprises consumer electronic devices including personal computer systems, and can be extended to incorporate other electronic devices in different combinations than those illustrated.

Network 10 includes an integrated receiver/decoder device such as intelligent controller device 12, video camera 14, television 16, personal computer 18, receiver 20, video cassette recorder (VCR) unit 22, and compact disk (CD) unit 24 that are coupled together in network 10 by a network interface (e.g., bus 30). The consumer electronic devices are each considered a logical entity represented as a node on network 10, with a unique address, a set of control registers, and volatile and non-volatile memory units. The consumer electronic devices in network 10 are capable of interacting with each other on a peer-to-peer basis, and data, commands and the like can be sent between the devices within network 10.

In the present embodiment, bus 30 is a bus compliant with IEEE 1394. Accordingly, the consumer electronic devices of network 10 communicate over bus 30 using a protocol compliant with IEEE 1394 such as AWC (audio visual control) protocol. Other embodiments of the present invention are operable within a network of consumer electronic devices compliant with the home audio/visual interoperability (HAVi) architecture that is known in the art. However, it is understood that other protocols, buses, network interfaces and network architectures may be utilized in accordance with the present invention.

Continuing with reference to FIG. 1, controller device 12 is an intelligent controller device such as a set-top-box or a personal computer. Controller device 12 is a system component/software element in network 10 that controls a target device (e.g., the other consumer electronic devices of network 10). Additional information regarding controller device 12 is provided below with regard to FIG. 2A.

Controller device 12 communicates with a user through a graphical user interface via some type of input/output device (not shown). The user's input/output device can be a number of well known devices including, for example, a remote control, a keyboard, a mouse or other cursor directing device, or a joystick, or a combination of these. Controller device 12 is typically coupled to a display device that enables the user to view menus or messages, and that also displays the user's input as the user enters it via the input/output device. The display device may be incorporated into controller device 12 or it may be separate from controller device 12; for example, television 16 could be used in conjunction with controller device 12 to display menus and messages to the user.

The consumer electronic devices in network 10 other than controller device 12 are referred as target devices. The target devices in network 10 store their content and/or broadcast services using some method or model providing a hierarchical set of data structures. The content of a target device refers to, for example, the data representing the music contained in a track of a compact disk. The broadcast services of a target device refers to the data that collectively represent each of the components of, for example, a television program; that is, one component might include the video portion, another component the audio portion, and a third component the text for closed captioning. Associated with the content and/or broadcast services are descriptive data for identifying each set of content data or broadcast service. The descriptive data includes, for example, the name of the content or broadcast service (e.g., the name of the television program) and other relevant details that may be of particular interest or help to further define the content or broadcast service (e.g., details regarding the particular episode, the names of characters, etc.).

One example of a model providing a hierarchical set of data structures for storing content and broadcast services is the AV/C object list model described in the patent application entitled "Method and Apparatus for Representing Devices and Available Information within a Network of Devices Using Object List and Object Entries," by Harold Aaron Ludtke, Ser. No. 09/040,540, U.S. Pat. No. 6,260,063, filed Mar. 17, 1998, assigned to the assignee of the present invention and herein incorporated by reference. In the AV/C object list model, an object is used to represent a distinct entity on the target device, such as a particular track on a compact disk or a particular compact disk loaded into a CD changer that holds multiple CDs. An object list is a list of the objects, such as the list of all CDs in the CD changer.

Figure 2A:
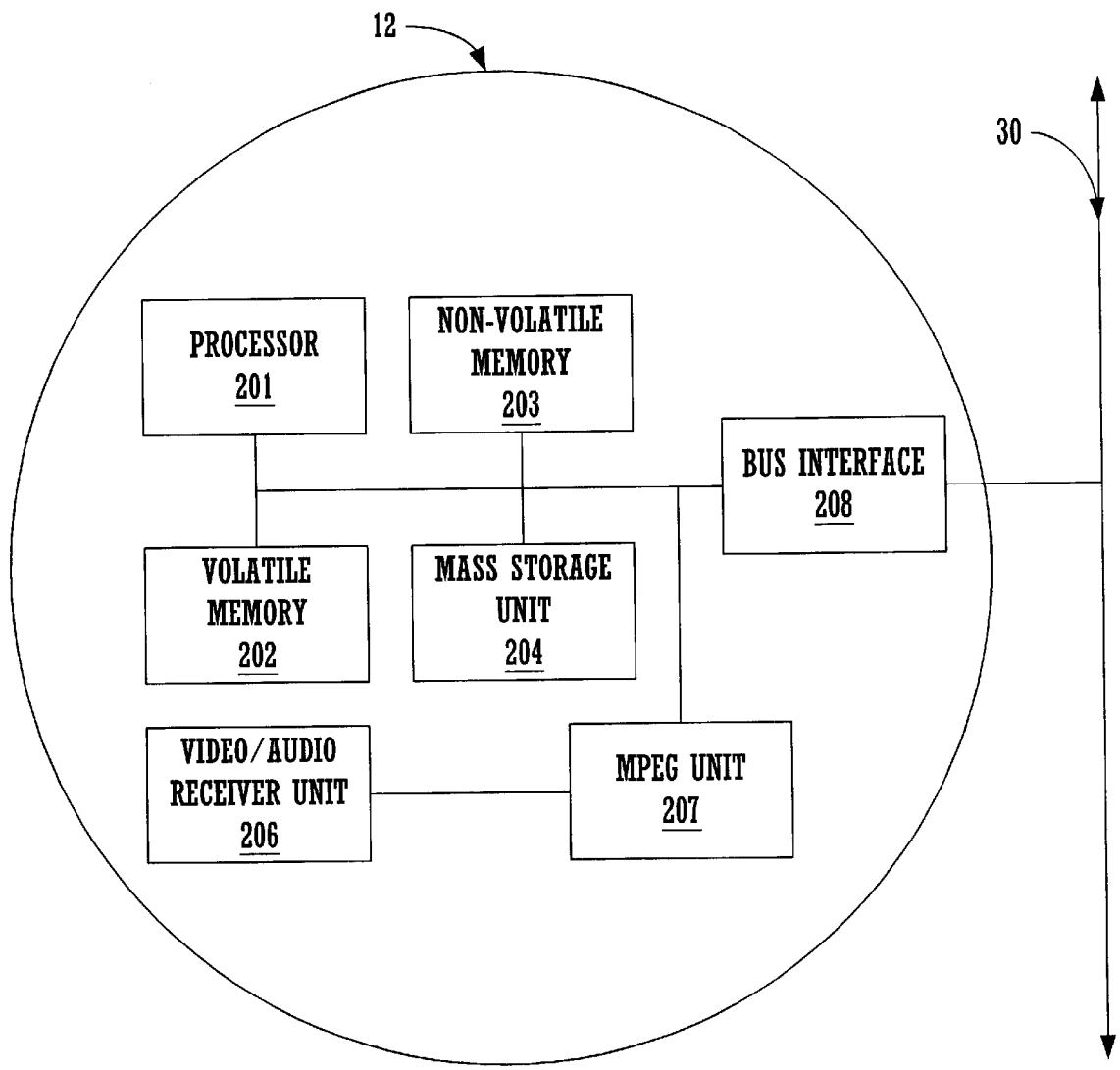
FIG. 2A is a block diagram of one embodiment of a controller device used in accordance with the present invention.

FIG. 2A is a block diagram of one embodiment of controller device 12 upon which embodiments of the present invention can be implemented. Although a variety of different systems can be used in accordance with the present invention, an exemplary system is represented by controller device 12.

With reference to FIG. 2A, controller device 12 includes processor 201 coupled with an internal address/data bus 200 for processing information and instructions. Volatile memory 202 (e.g., random access memory), for storing information and instructions for processor 201, is also coupled to bus 200. Non-volatile memory 203 (e.g., read only memory), for storing static information and instructions for processor 201, is coupled to bus 200. Controller device 12 optionally includes mass storage unit 204 (e.g., a data storage device such as a magnetic or optical disk and disk drive) coupled to bus 200 for storing information and instructions. Controller device 12 also includes video/audio receiver unit 206 and Moving Pictures Expert Group (MPEG) unit 207 coupled to bus 200. Bus interface 208 is used for interfacing with network bus 30.

FIG. 2B is a block diagram of one embodiment of target device 220 upon which embodiments of the present invention can be implemented. Although a variety of different systems can be used in accordance with the present invention (e.g., the target devices shown FIG. 1), an exemplary system is represented by target device 220.

In general, target device 220 comprises bus 230 for communicating information, processor 221 coupled with bus 230 for processing information and instructions, random access memory (RAM volatile) 222 coupled with bus 230 for storing information and instructions for processor 221, read-only memory (ROM non-volatile) 223 coupled with bus 230 for storing static information and instructions for processor 221, data storage device 224 such as a magnetic or optical disk and disk drive coupled with bus 230 for data such as media data, objects, content and broadcast services, and bus interface 228 for interfacing with network bus 30.

Search and Discovery Process

The present invention provides a system and method of same for performing a search of the descriptive data stored on target devices in an AV network such as network 10 of FIG. 1. In accordance with the present invention, search criteria are specified and transmitted as a command structure from controller device 12 to the target devices (or to a particular target device, depending on the search criteria that are specified) over network bus 30. In response to the command structure, the target devices conduct a search of the data against the search criteria. When a match with the search criteria is found, the target device sends a response to controller device 12 over network bus 30, and also includes in the response an identifier (e.g., a pointer) associated with the discovered data so that the discovered data can be subsequently accessed and retrieved when needed by the user. As will be seen by the detailed discussion below, by having the target devices perform the data search operation and rely on a pointer as to the results, the present invention significantly reduces the amount of data trafficking over the network bus, and also significantly reduces the degree of data processing on the part of the controller device and the target devices.

FIG. 3 is a flow chart of one embodiment of process 300 used in accordance with the present invention to perform a search of the descriptive data stored in target devices in an AV network. In the present embodiment, process 300 is implemented as program instructions in intelligent devices connected to the AV network, such as controller device 12 and target device 220 of FIGS. 2A and 2B. Additional details for implementing process 300 are provided following the discussion of FIG. 3.

In step 305, using any one of a variety of methods that are well known in the art, the user indicates the object for which he/she wishes to search. For example, the user is provided with a menu or display on a display device coupled to the network, such as television 16 of FIG. 1. Using an known input/output device such as a familiar remote control unit, the user identifies the object for which the search is to be performed. The user may also indicate where to search, a starting point for the search, or the direction in which to conduct the search. For example, the user may initiate a search for another track by entering in the subject of the search, such as the title of the track. If the user has previously located a specific track on a compact disk, the user can also indicate that the search should begin at this track, and that the search should proceed to either the next higher or the next lower track on the object list. Thus, the user identifies the search criterion or criteria that are to be used as the basis for identifying the object for which the search is to be performed. However, should the user not enter in a particular search criterion, such as the direction of the search, a default value is automatically entered in accordance with the present invention and the search proceeds accordingly. Alternatively, controller device 12 can provide some of the search criteria (such as whether to search in the forward direction, etc.).

In step 310, based on the user's input, the controller device (e.g., controller device 12 of FIG. 1) formulates a command structure containing the search criteria identified by the user in step 305. A prescribed format is used for the command structure. In the present embodiment, one of the bytes (e.g., an opcode byte) in the command structure format is used to indicate that the command structure is a request for a search to be performed. The present invention takes the search criteria specified by the user and enters them into the appropriate fields of the command structure in the proper format specified for the command (additional details regarding the command structure format are provided below).

In step 315, with reference to FIGS. 1 and 3, the command structure is transmitted from the controller device over bus 30 to the target devices on network 10. The command structure may be transmitted to a single target device or to a limited number of devices, typically one device at a time.

In step 320 of FIG. 3, the target device (e.g., target device 220 of FIG. 2B) reads the opcode byte in the command structure and thereby recognizes that the command is a search request. Target device 220 executes the command structure and conducts a search of its descriptive data using the search criteria specified in the command structure. The search is conducted by matching the search criteria against the descriptive data using techniques known in the art. Thus, in accordance with the present invention, the search is conducted on the target devices themselves, and the descriptive data or other data do not need to be transmitted over network bus 30 to controller device 12 in order for the search to be performed. Hence, the target devices are not burdened with having to process the data into a format required by the controller device. In addition, the bandwidth of network bus 30 is not consumed by the data transfer from the target devices to controller device 12. Furthermore, it is not necessary for controller device 12 to be burdened with the search of the large amounts of descriptive data. Instead, the target devices perform the search, which overall provides a more effective utilization of network resources.

In step 325, descriptive data matching the search criteria are identified by target device 220 and an identifier corresponding to that data is also determined. The identifier can be of any one of a variety of types (e.g., a pointer, a title, a name, a memory location, etc.) that enable the descriptive data to be subsequently located and accessed by controller device 12. As will be seen by the discussion provided below, it is possible to specify in the command structure the type of identifier that should be provided in response to the command. For example, the identifier can be the address in the target device's register or memory unit where the data are located. In the case of data structures such as lists, objects, or some other descriptor, the identifier contains enough information for the controller device to subsequently locate the descriptive data satisfying the search criteria. In the present embodiment, once an object that satisfies the search criteria is identified, the search is concluded.

In step 330, the identifier determined in step 325 is transmitted by target device 220 to controller device 12 over network bus 30. In accordance with the present invention, only the identifier is transmitted at this point. Hence, only a small amount of data is transferred from target device 220 to controller device 12. The bandwidth capacity required for this transfer is very small. Thus, the present invention results in efficient use of the available bandwidth capacity.

In step 335, at any time desired by the user, the identifier from steps 325 and 330 can be used by controller device 12 to access the descriptive data and the associated content/broadcast service by accessing target device 220 using the well known AV/C protocol.

In step 340, the descriptive data identified in step 325 are transferred over bus 30 from target device 220 to controller device 12. Similarly, the associated content/broadcast service data can be transmitted over bus 30 to controller device 12 or streamed to the appropriate consumer electronic device for the user to view and/or listen to.

In alternative embodiments, the descriptive data associated with the identifier and/or the associated content/broadcast service can be transmitted with the identifier (e.g., during step 330, thereby eliminating steps 335 and 340).

Figure 4A:
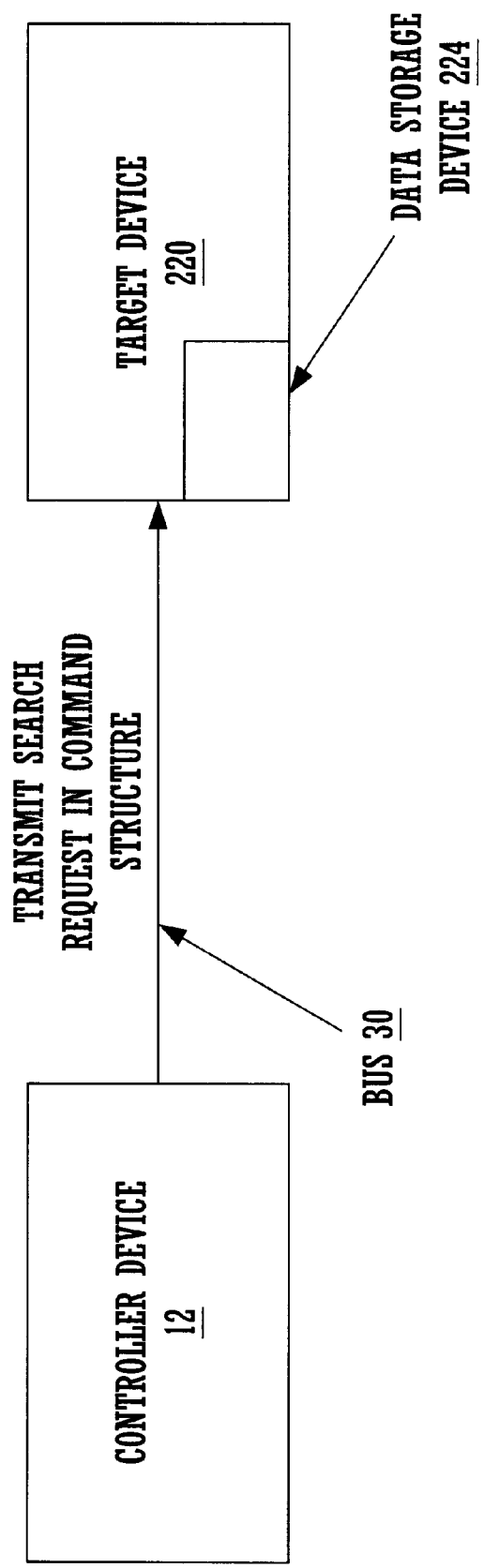
FIGS. 4A, 4B, 4C and 4D are data flow diagrams of a controller device and a target device in accordance with one embodiment of the present invention.

FIGS. 4A through 4D illustrate the flow of data associated with process 300 in accordance with one embodiment of the present invention. Referring to FIG. 4A, controller device 12 transmits the search request in a command structure to target device 220 over network bus 30 (e.g., step 315 of FIG. 3).

Figure 4B:
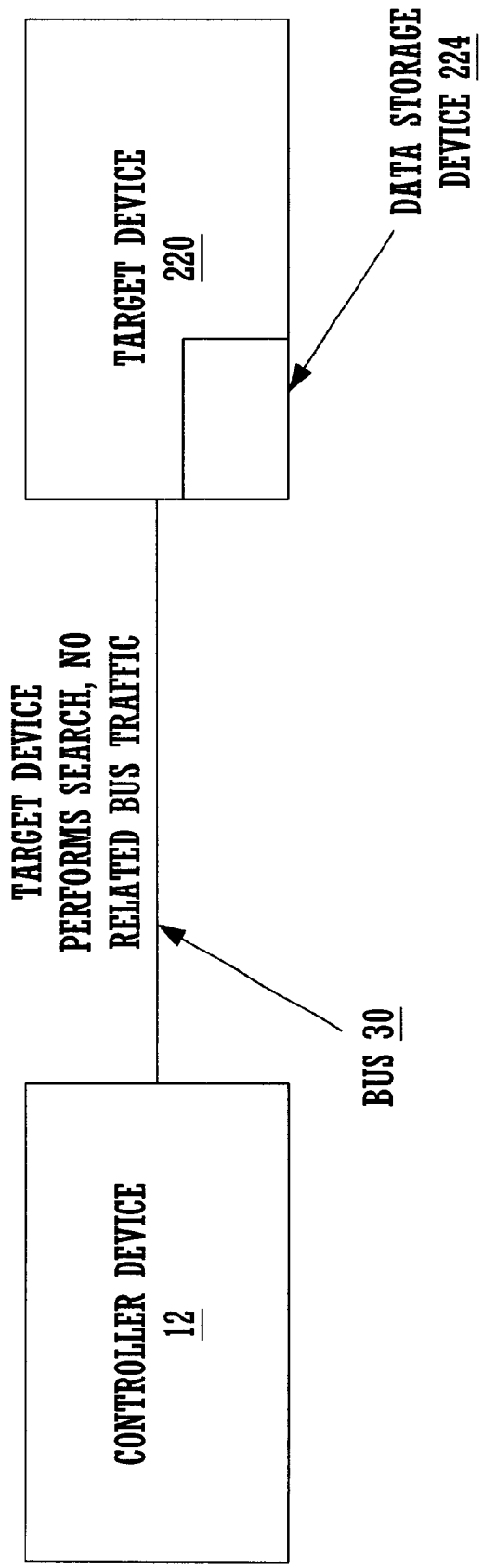

With reference to FIG. 4B, target device 220 recognizes the command structure as a request to perform a search and executes a search of data storage device 224 according to the search criteria provided by the command structure (e.g., steps 320 and 325 of FIG. 3). During the period of the search, there is no search-related traffic over network bus 30.

Figure 4C:
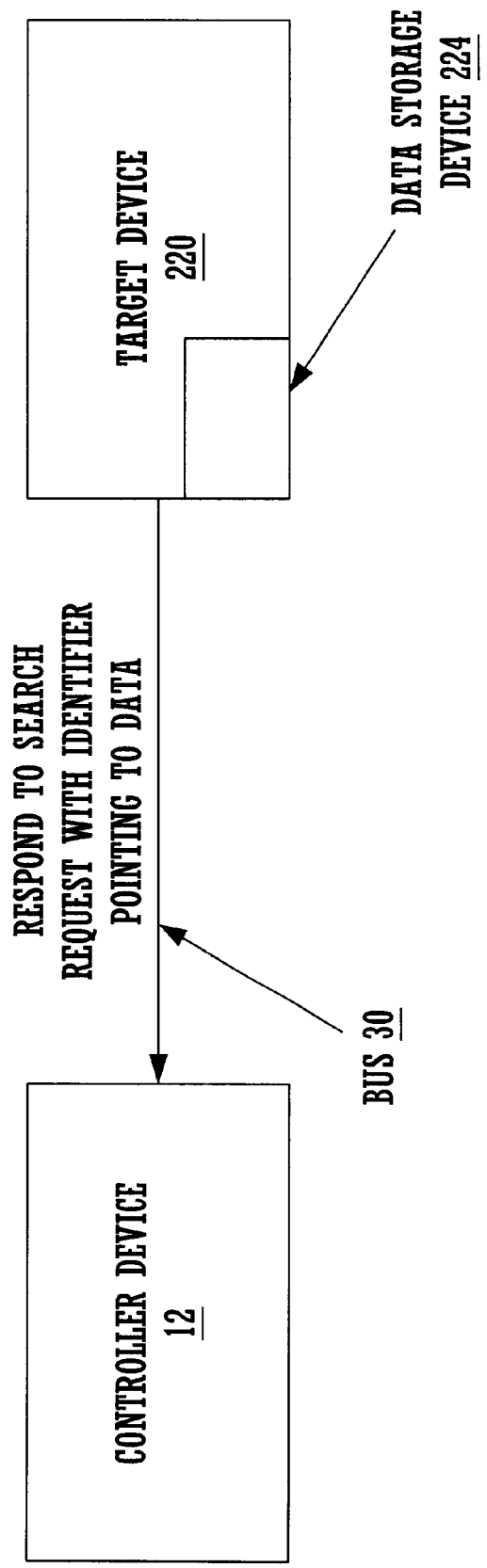

With reference to FIG. 4C, target device 220 transmits to controller device 12 the identifier associated with the descriptive data that satisfy the search criteria (e.g., step 330 of FIG. 3).

Figure 4D:
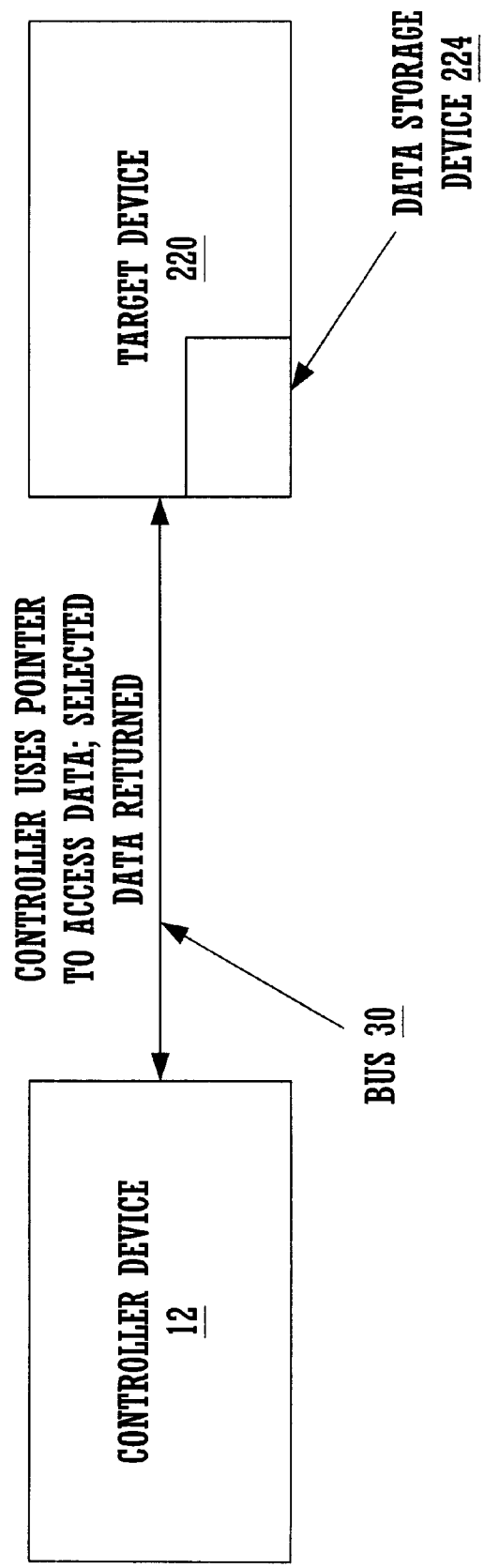

With reference to FIG. 4D, controller device 12 subsequently uses the identifier to access the descriptive data satisfying the search criteria on target device 220, and target device 220 returns to controller device 12 the descriptive data specified by the identifier or a media object described by the descriptive data (e.g., steps 335 and 340 of FIG. 3).

In alternative embodiments, the descriptive data associated with the identifier and/or the associated content/broadcast service can be transmitted with the identifier (e.g., as illustrated by FIG. 4C, thereby obviating the transactions illustrated by FIG. 4D).

Thus, in accordance with the present invention, the search is conducted on the target device(s). Initially, the search results consist only of an identifier associated with the data that satisfies the search criteria, and only the identifier is transmitted from the target device to the controller device. Subsequently, when the descriptive data and the content/broadcast service data are transferred from the target device, only the data of interest based on the preferences of the user are transferred. Therefore, relative to the prior art, the present invention substantially reduces the amount of data that is transferred over the network bus and processed by the target and controller devices.

Depending on the implementation of target device 220, the present invention can increase the efficiency of the search operation. In most typical target devices, the target device is required to gather the information necessary to compile the descriptive data because the descriptive data are not stored in a single location which is quickly accessible. In fact, the descriptive data usually must be compiled from distinct pieces of information which the target device can find inside itself. Because the target device has its own internal knowledge of how to get this data, it may be able to search through the data without first packaging it into the format which is expected by controller device 12. Thus, the present invention can result in a savings of processing cycles (e.g., clock cycles) and other resources in target device 220.

Additionally, if target device 220 does not have to use processing power to send data out to network bus 30, then savings in processing power are also realized by not performing this task. It's possible that, depending on the interface technology built into target device 220, in terms of processing cycles the search operation in accordance with the present invention is essentially free due to hardware automation, depending on the implementation of the target device.

The present invention also provides compatibility with future implementations of a certain class of consumer electronic devices. Some electronic devices, such as general purpose hard disks or other mass-storage devices, will be designed to record any type of data stream which comes over a 1394 network bus. These electronic devices will not have specific knowledge about the data stream (for example, they will not understand the data format); they will simply record the data as they arrive from the network bus. These electronic devices will not be capable of creating the descriptive data that controller devices will use to understand what is stored on the media. For example, if an audio CD is copied to a hard disk, the hard disk will not be able to analyze the recorded data and create a table of contents describing the track titles, lyrics, etc. In fact, another controller device will have to write those descriptive data structures to the hard disk after the copy operation is complete.

In the future, when a controller device wants to search for a particular piece of content, the controller device will want to send the remote search command to the hard disk, as described in the present invention. However, the hard disk understands neither the data content nor the detailed fields of the descriptor data structures. Therefore, the hard disk would not be able to look for a specified field such as one named "track title" in order to find the audio track with a specific title.

The present invention solves the above problem by allowing a search specification based on certain criteria which do not require the hard disk to understand the descriptive data structures. Thus, the hard disk can be a useful player in future implementations of an AV network even as new media types are invented. An example of how this works is provided below in conjunction with FIG. 6.

In one embodiment of the present invention, the search command is used in combination with a proxy device of the type exemplified in the patent application entitled "A Method and System for Defining and Discovering Proxy Functionality on a Distributed Audio Video Network," by Harold Aaron Ludtke, Ser. No. 09/151,373, now U.S. Pat No. 6,231,049, filed Sep. 10, 1998, assigned to the assignee of the present invention and herein incorporated by reference.

Figure 5A:
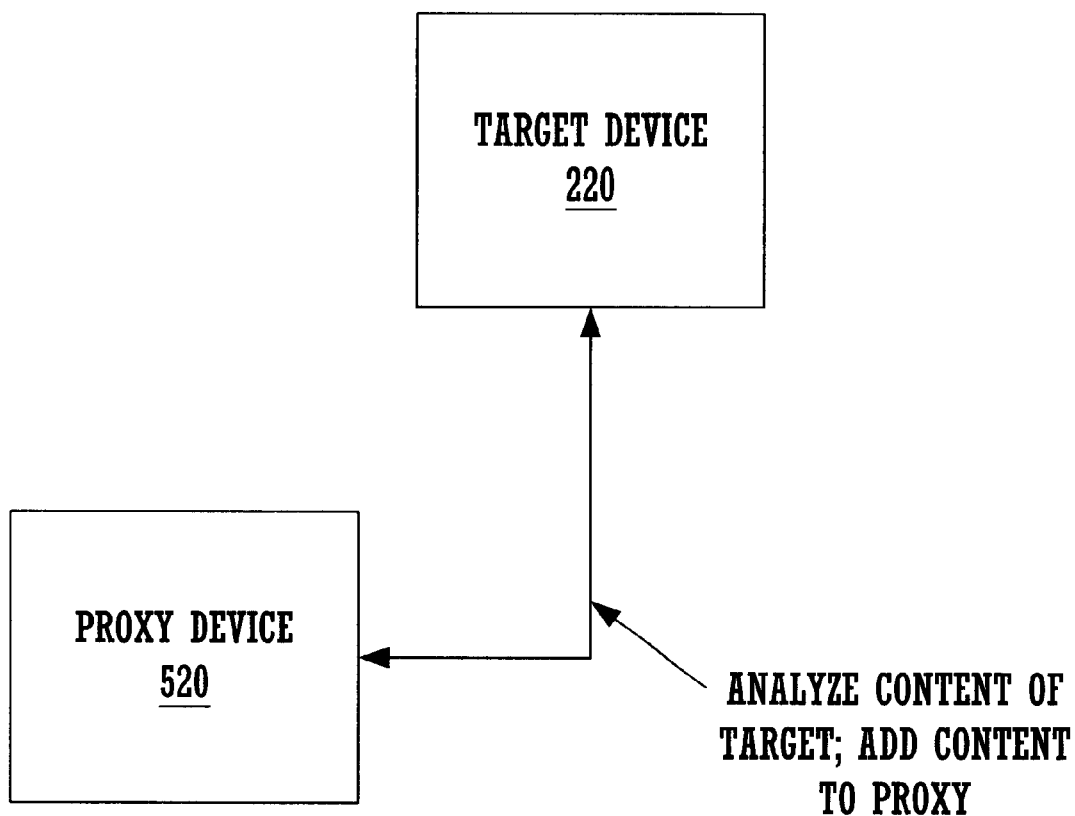
FIGS. 5A, 5B, 5C and 5D are data flow diagrams of a controller device, a target device, and a proxy device in accordance with one embodiment of the present invention.

FIGS. 5A through 5D are illustrations of the flow of data between controller device 12, target device 220, and proxy device 520, where proxy device 520 is a proxy for target device 220 in accordance with the patent application referenced above. Each of these devices is coupled to network bus 30 (not shown), and the flow of data occurs over network bus 30. Referring to FIG. 5A, proxy device 520 analyzes the data content of target device 220 and stores this content in memory. The data content can include descriptive data or it can include objects described by the descriptive data.

Figure 5B:
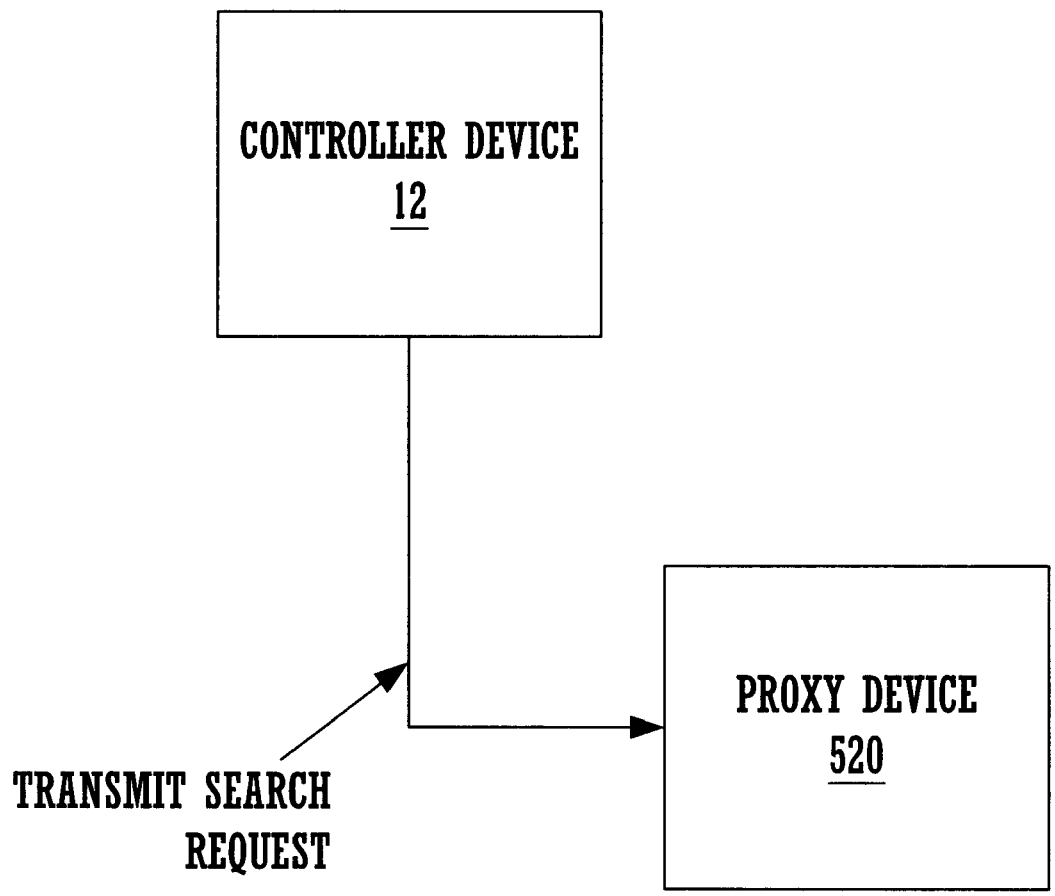

With reference to FIG. 5B, controller device 12 transmits the search request in a command structure that is sent to proxy device 520 over network bus 30 (e.g., as described by step 315 of FIG. 3). Controller device 12 recognizes that proxy device 520 is a proxy for target device 220 and therefore communicates the command structure to proxy device 520 instead of target device 220. Proxy device 520 recognizes the command structure as a request to perform a search and executes a search of its memory according to the search criteria provided by the command structure.(e.g., steps 320 and 325 of FIG. 3). During the period of the search, there is no search-related traffic over network bus 30.

Figure 5C:
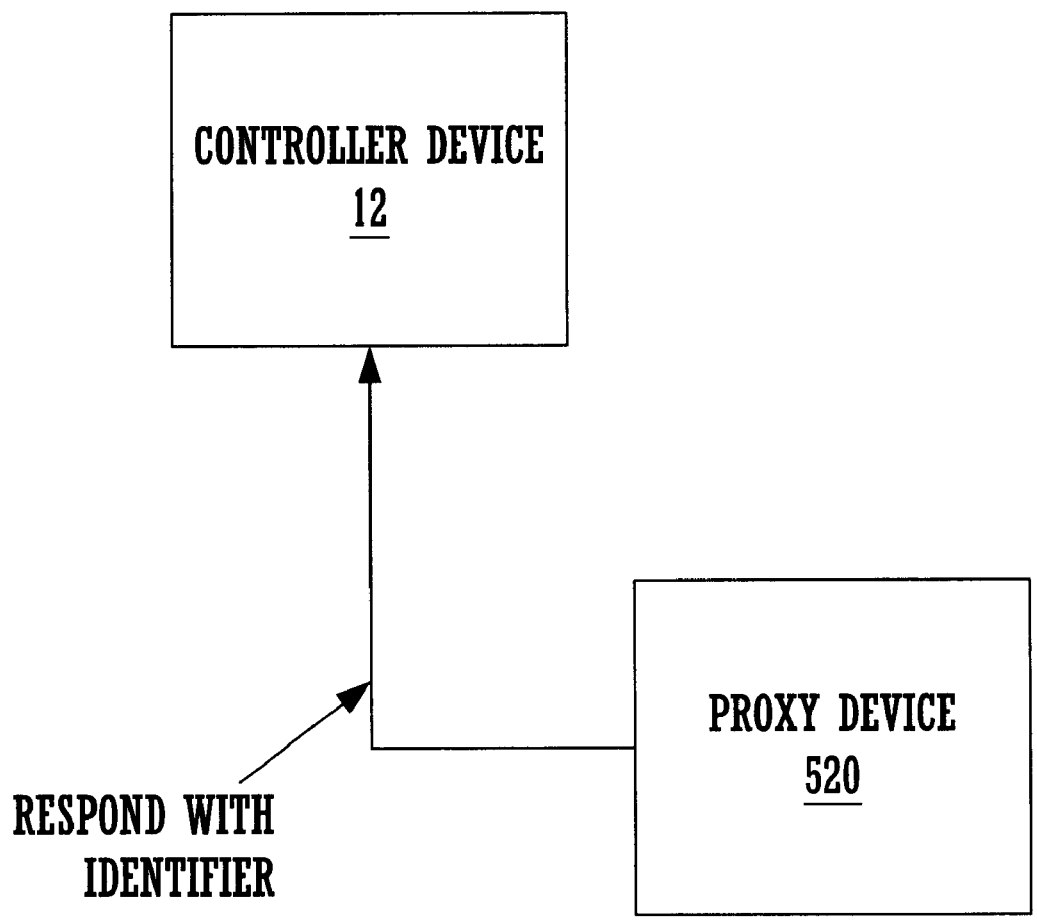

With reference to FIG. 5C, proxy device 520 transmits to controller device 12 the identifier associated with the descriptive data that satisfy the search criteria (e.g., step 330 of FIG. 3).

Figure 5D:
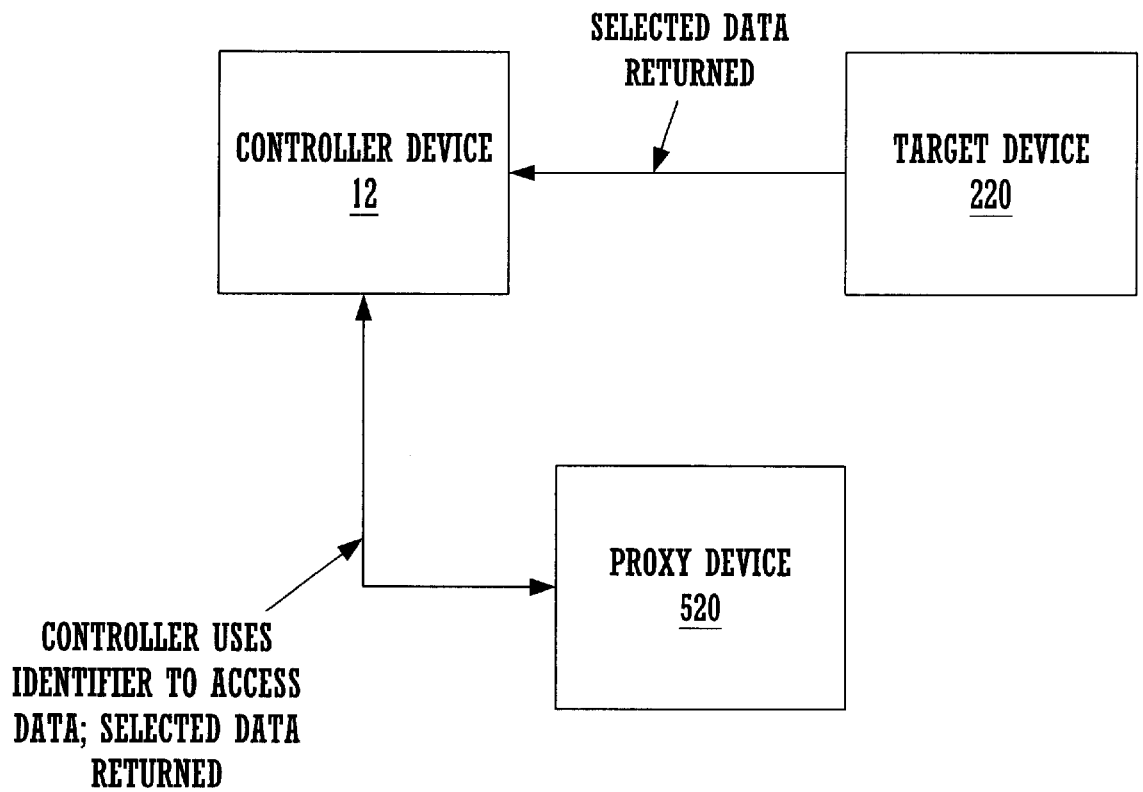

With reference to FIG. 5D, controller device 12 subsequently uses the identifier to access the descriptive data satisfying the search criteria on proxy device 520. Proxy device 520 returns to controller device 12 over network bus 30 the descriptive data specified by the identifier. Depending on the amount of data transferred from target device 220 to proxy device 520, proxy device 520 can also transfer a media object described by the descriptive data (e.g., steps 335 and 340 of FIG. 3). Alternatively, proxy device 520 can direct target device 220 to transfer the media. object described by the descriptive data.

For example, a personal computer will identify itself as a proxy for a CD unit. Over time, as a user places CDs into the CD unit, the personal computer will analyze the content of each CD and add that content to a database maintained on the personal computer. In this database, for example, the personal computer keeps track of the CD titles, the individual track titles, and the like. When a user subsequently decides to conduct a search of the music that is available on the home network, the controller device in accordance with the present invention searches the network and identifies the personal computer acting as the proxy for the CD unit. The controller device initiates the search on the home network in accordance with the present invention, and the personal computer returns the results of the search on behalf of the CD unit and any other electronic devices for which it is acting as the proxy, even if the devices are not currently connected to the home network.

Thus, the proxy model permits a distributed search for the desired content or broadcast service and utilizes, for example, a personal computer with much greater resources than a typical CD unit. Note that the distributed search described above can be accomplished without using the proxy model described by the reference by having target devices on the network communicate with each other, such as in the HAVi network architecture that is known in the art.

Exemplary Implementation of Command Structure

One example of a model providing a hierarchical set of data structures for storing content and broadcast services is the AV/C object list model described in the patent application entitled "Method and Apparatus for Representing Devices and Available Information within a Network of Devices Using Object List and Object Entries," by Harold. Aaron Ludtke, Ser. No. 09/040,540, now U.S. Pat No. 6,260,063, filed Mar. 17, 1998, assigned to the assignee of the present invention and herein incorporated by reference. An embodiment of the present invention implemented with the data structure of this reference is described below. In the discussion below, "object position," "object ID," "list ID," "list type" and other similar terms are used in the context of this reference. However, it is understood that the present invention is not limited by the embodiment discussed below nor is it limited to application with the above reference.

With reference to Table 1, the SEARCH DESCRIPTOR command allows the controller device (e.g., controller device 12) to request that a target device (e.g., the target devices of network 10) execute a search of the descriptive data (that is, not the content or broadcast service data) looking for an entry that satisfies the specified search criteria. If the search is successful, the result of the search is returned to controller device 12 in the form of an identifier associated with the descriptive data. The identifier is sufficiently detailed to allow controller device 12 to subsequently locate the descriptive data identified by the search. The SEARCH DESCRIPTOR command is identified by an opcode byte which identifies the command as a request to perform a search. One embodiment of the format of the SEARCH DESCRIPTOR command (e.g., the command frame) is provided in Table 1 below.

(Note: in the tables and discussion below, values are in hexadecimal notation, "msb" refers to most significant bit, and "lsb" refers to least significant bit.)

TABLE 1

Exemplary SEARCH DESCRIPTOR Command

| opcode | msb SEARCH DESCRIPTOR (OB) | lsb |
|---|---|---|
| operand[0] | search_for | |
| : | | |
| : | search_in | |
| : | | |
| : | start_point | |
| : | | |
| : | direction | |
| : | response_format | |
| : | status | |

The search_for operand of the SEARCH DESCRIPTOR command specifies what the target device is to search for. One embodiment of the format for the search_for operand is provided in Table 2 below. The length operand specifies the number of bytes for the search_data operand. The search_data operand contains the subject of the search, and these bytes can be presented as text bytes such as "CNN" or they can be presented as any numerical value. The length operand can be set to zero if there is no preference for a particular subject to be searched for. Hence, the search_for operand is flexible and is suited for descriptor data structures of varying length depending on what is being searched for.

TABLE 2

Exemplary Search_for Operand

| address offset | msb | search_for operand of SEARCH DESCRIPTOR | lsb |
|---|---|---|---|
| 00 | | length | |
| 01 | | search_data | |
| : | | | |

The search_in operand of the SEARCH DESCRIPTOR command specifies the location and scope of the search. The search_in operand is useful for narrowing the search when possible. One embodiment of the search_in operand is provided in Table 3 below. The length operand here specifies the number of bytes in the type_specific_info operand. The type_specific_info operand specifies the scope and location of the search. The format of the type_specific_info operand is defined by the value of type. The values for the type operand are provided for one embodiment by Table 4 below.

TABLE 3

Exemplary Search_in Operand

| address offset | msb | search_in operand of SEARCH DESCRIPTOR | lsb |
|---|---|---|---|
| 00 | | length | |
| 01 | | type | |
| 02 | | type_specific_info | |
| : | | | |

TABLE 4

Exemplary Search_in Type Values

| type | meaning |
|---|---|
| 10 | fields specified by an offset address and length in Object Descriptors |
| 12 | entry_type fields in Object Descriptors |
| 14 | child_list_ID in Object Descriptors |
| 16 | object_ID fields in Object Descriptors |
| 20 | fields specified by an offset address and length in Object List Descriptors |
| 22 | list_type fields in Object List Descriptors |
| 30 | fields specified by an offset address and length in Other Descriptors |
| 40 | Objects in Object List Descriptors |
| 50 | Object Lists |
| 60 | Other Descriptors |
| all others | reserved |

The start_point operand of the SEARCH DESCRIPTOR command specifies where the search is to begin. The length operand here specifies the number of bytes in the type_specific_info operand. The type operand here specifies how the starting point is indicated in the type_specific_info operand. One embodiment of the start_point operand is provided in Table 5 below. The values for the type operand are provided for one embodiment in Table 6 below.

TABLE 5

Exemplary Start_point Operand

| address offset | msb | | lsb |
|---|---|---|---|
| | start_point operand of SEARCH DESCRIPTOR | | |
| 00 | length | | |
| 01 | type | | |
| 02 | type_specific_info | | |
| : | | | |
| : | | | |

TABLE 6

Exemplary Start_point Type Values

| type | starting point for search |
|---|---|
| 00 | The target device chooses where to start the search |
| 01 | At the current location, where the current location is defined by the currently selected Object Descriptor or the position of the last search result |
| 10 | At the point specified by an offset address in the specified Object Entry Descriptor, where the object is specified by object_position |
| 11 | At the point specified by an offset address in the specified Object Entry Descriptor, where the object is specified by object_ID |
| 12 | At the entry_type field in the specified Object Entry Descriptor, where the object is specified by object_position |
| 13 | At the entry_type field in the specified Object Entry Descriptor, where the object is specified by object_ID |
| 14 | At the child_list_ID field in the specified Object Entry Descriptor, where the object is specified by object_position |
| 15 | At the child_list_ID field in the specified Object Entry Descriptor, where the object is specified by object_ID |
| 16 | At the object_ID field in the specified Object Entry Descriptor, where the object is specified by object_position |
| 17 | At the object_ID field in the specified Object Entry Descriptor, where the object is specified by object_ID |
| 20 | At the point specified by an offset address in the Object List Descriptor, where the list is specified by its list_ID |
| 22 | At the list_type field in the specified Object List Descriptor, where the list is specified by its list_ID |
| 30 | At the point specified by an offset address in the Other Descriptor, where that descriptor is specified by a descriptor_identifier structure |
| all others | reserved |

The direction operand of the SEARCH DESCRIPTOR command specifies how the search should proceed. The meanings of the direction operand are provided for one embodiment in Table 7 below.

TABLE 7

Exemplary Direction Operand Values

| direction | meaning |
|---|---|
| 00 | The target device chooses the direction of the search |
| 10 | Up, in the increasing order of the search_for specifier, the target device selects the direction |
| 12 | Up, in the increasing order of the search_for specifier, based on the object_entry_position |
| 13 | Up, in the increasing order of the search_for specifier, based on the object_ID |
| 20 | Down, in the decreasing order of the search_for specifier, the target device selects the direction |
| 22 | Down, in the decreasing order of the search_for specifier, based on the object_entry_position |
| 23 | Down, in the decreasing order of the search_for specifier, based on the object_ID |
| all others | reserved |

The response_format operand of the SEARCH DESCRIPTOR command specifies how the return data are to be presented to controller device 12. Values for the response_format operand are provided for one embodiment in Table 8.

TABLE 8

Exemplary Response_format Operand Values

| response_format | meaning |
|---|---|
| 00 | Not specified - target device selects |
| 10 | By descriptor_type 10 (specified by ID_list) |
| 11 | By descriptor_type 11 (specified by list_type) |
| 20 | By descriptor_type 20 (specified by object_position) |
| 21 | By descriptor_type 21 (specified by object_ID) |
| all others | reserved |

The status operand of the SEARCH DESCRIPTOR command is set to FF by controller device 12. The status operand is updated in the response to indicate the result of the search operation when the search is successful.

The response to a SEARCH DESCRIPTOR command (e.g., the response frame) is provided in Table 9 for one embodiment. The response frame shown by Table 9 is sent when the search request is "accepted;" that is, the target device accepted the command and attempted to carry out the search. When the search request is "rejected" (that is, the target device refused the search request because, for example, invalid parameters are specified), a simple frame is sent from the target device to controller device 12 instead of the response frame shown in Table 9. For simplicity, the command frame and the response frame typically have the same structure, although this does not have to be the case. The operands from search_for through direction are as described above. These operands will be returned in the response frame with the same value as they had in the command frame. The response_format operand will contain either the originally specified value (in the case where a specific format was specified by controller device 12 in the command frame), or a value indicating the format selected by the target device. The status operand specifies the status of the search after it is completed. The status can be "successful," meaning that either the specified data or any data matching the search criteria were found. The status can also be "unsuccessful," meaning that no data matching the search criteria were found. The descriptor_identifier operand identifies the data which are being returned from the target device. The data will be in the format indicated by the response_format operand. The address operand specifies where the returned data can be found in the case of a search for a data field. In the case of descriptor structures such as lists, objects, or any other descriptor, the descriptor_identifier operand will contain enough information for controller device 12 to access the data.

TABLE 9

Exemplary Response Frame to SEARCH DESCRIPTOR Command

| opcode | msb SEARCH DESCRIPTOR (OB) | lsb |
|---|---|---|
| operand[0] | search_for | |
| : | | |
| : | search_in | |
| : | | |
| : | start_point | |
| : | | |
| : | direction | |
| : | response_format | |
| : | status | |
| : | descriptor_identifier | |
| : | | |
| : | address | |
| : | | |

The type_specific_info structure for the search_in operand of the SEARCH DESCRIPTOR command makes use of either the object_entry_descriptor_specifier data structure or the object_list_descriptor_specifier data structure. An embodiment of each of these data structures is provided in Tables 10 and 11, respectively. The object_entry_descriptor_specifier data structure specifies an object entry; in the context of the search_in operand, it specifies an object or collection of objects in which the search operation should be performed. The object_list_descriptor_specifier data structure identifies an object list (or more than one list); in the context of the search_in operand, it specifies the list or a collection of lists in which the search operation should be performed.

TABLE 10

Exemplary Object_entry_descriptor_specifier Data Structure

| address offset | msb object_entry_descriptor_specifier | lsb |
|---|---|---|
| 00 | type | |
| : | type_specific | |
| : | | |
| : | | |

TABLE 11

Exemplary Object_list_descriptor_specifier Data Structure

| address offset | msb object_list_descriptor_specifier | lsb |
|---|---|---|
| 00 | type | |
| : | type_specific | |
| : | | |
| : | | |

Table 12 provides the relationship between the type operand and the type_specific operand in one embodiment of the object_entry_descriptor_specifier data structure.

TABLE 12

Exemplary Object_entry_descriptor_specifier Type Values

| type | meaning | type_specific field |
|---|---|---|
| 20 | a specified object by position | object_position |
| 21 | a specified object by object_ID | object_ID |
| 22 | any objects with specified entry_type field | entry_type |
| 2F | any objects | none |
| all others | reserved | |

Table 13 provides the relationship between the type operand and the type_specific operand in one embodiment of the object_list_descriptor_specifier data structure.

TABLE 13

Exemplary Object_list_descriptor_specifier Type Values

| type | meaning | type_specific field |
|---|---|---|
| 10 | a specified list by list_ID | list_ID |
| 12 | any lists with the specified list_type | list_type |
| 1F | any lists | none |
| all others | reserved | |

Table 14 provides one embodiment of each of the type_specific_info data structures for the search_in operand of the SEARCH DESCRIPTOR command for each of the search_in type values that are provided in Table 4. The descriptor_identifier structure is used to specify one of the non-object and non-list descriptor structures in which the search operation is to be performed. The offset_address field specifies the starting address within the specified descriptor structure to begin the search. The length field here specifies the number of bytes over which the search is to be performed.

TABLE 14

Exemplary Type_specific_info Data Structures for the Search_in Operand

| address offset | msb | lsb |
|---|---|---|
| | type_specific_info for search_in operand; type 10 | |
| 00 | object_list_descriptor_specifier | |
| : | | |
| : | object_entry_descriptor_specifier | |
| : | | |
| : | offset_address | |
| : | | |
| : | length | |
| | type_specific_info for search_in operand, type 12 | |
| 00 | object_list_descriptor_specifier | |
| : | | |
| : | object_entry_descriptor_specifier | |
| : | | |

TABLE 14-continued

Exemplary Type_specific_info Data Structures for the Search_in Operand

| address offset | msb | lsb |
|---|---|---|
| | type_specific_info for search_in operand, type 14 | |
| 00 : : : : | object_list_descriptor_specifier object_entry_descriptor_specifier type_specific_info for search_in operand, type 16 | |
| 00 : : : | object_list_descriptor_specifier object_entry_descriptor_specifier type_specific_info for search_in operand, type 20 | |
| 00 : : : : | object_list_descriptor_specifier offset_address length type_specific_info for search_in operand, type 22 | |
| 00 : : | object_list_descriptor_specifier type_specific_info for search_in operand, type 30 | |
| 00 : : : : | object_list_descriptor_specifier offset_address length type_specific_info for search_in operand, type 40 | |
| 00 : : | object_list_descriptor_specifier object_entry_descriptor_specifier type_specifier_info for search_in operand, type 50 | |
| 00 : : | object_list_descriptor_specifier type_specific_info for search_in operand, type 60 | |
| 00 : : | descriptor_identifier | |

Table 15 provides one embodiment of each of the type_specific_info data structures for the start_point operand of the SEARCH DESCRIPTOR command for each of the start_point type values that are provided in Table 6. The offset_address field specifies the offset from the beginning of the descriptor structure specified in the start_point oper and. The entry_type field refers to the type of object entry as defined by the entry_type field of the object descriptor structures.

TABLE 15

Exemplary Type_specific_info Data Structures for the Start_point Operand

| address offset | msb | lsb |
|---|---|---|
| | type_specific_info for start_point operand, type 10 | |
| 00 : : : | descriptor_identifier for object entry position reference offset_address | |
| | type_specific_info for start_point operand, type 11 | |
| 00 : : : | descriptor_identifier for object ID reference offset_address | |
| | type_specific_info for start_point operand, type 12 | |
| 00 : : : | descriptor_identifier for object entry position reference entry_type type_specific_info for start_point operand, type 13 | |
| 00 : : : | descriptor_identifier for object ID reference entry_type type_specific_info for start_point operand, type 14 | |
| 00 : : | descriptor_identifier for object entry position reference type_specific_info for start_point operand, type 15 | |
| 00 : : | descriptor_identifier for object ID reference type_specific_info for start_point operand, type 16 | |
| 00 01 02 03 04 | descriptor_identifier for object entry position reference (5 bytes) type specific_info for start_point operand, type 17 | |
| 00 : : | descriptor_identifier for object ID reference (k + 4 bytes) type_specific_info for start_point operand, type 20 | |
| 00 01 02 03 04 | descriptor_identifier for object list specified by ID (3 bytes) offset_address type_specific_info for start_point operand, type 22 | |
| 00 : | descriptor_identifier for object entry position reference | |

TABLE 15-continued

Exemplary Type_specific_info Data Structures for the Start_point Operand

| address offset | msb | lsb |
|---|---|---|
| : | type_specific_info for start_point operand, type 30 | |
| 00 : : : : | descriptor_identifier for object entry position reference offset_address | |

The embodiment of the present invention described above allows the search to be specified and conducted based on search criteria which do not require the storage device (e.g., the hard drive on the target devices) to understand the structure of the descriptive data. The present invention therefore provides the flexibility needed that is expected to allow the present invention to remain compatible with AV networks even after changes and improvements are made to the networks and to the consumer electronic devices that make up the networks or to the data formats used by these devices.

FIG. 6 illustrates an exemplary command structure 600 used for conducting a search (note that the numerical values are in hexadecimal notation). Command structure 600 demonstrates how an arbitrary field of an object descriptor structure can be searched for a specified value. Command structure 600 can be used to find fields which may be unknown to the target device (e.g., target device 220 of FIG. 2B). In this example, a search is specified in operands[0–3] for the text "NHK" which is represented by ASCII characters in command structure 600. The object_ID response format is specified in command structure 600 by operand [13].

In summary, the present invention provides a system and method for performing a search on the target device which contains the stored data and not on the controller device. Consequently, only a relatively small amount of data is transmitted over the network bus, thus consuming only a small portion of the available bandwidth capacity of the bus and improving overall network performance. Additionally, the controller device is not burdened with searching through a large amount of data in order to find the data of interest. Likewise, the target devices are not burdened by having to process and format a large amount of data in order to prepare that data to be transferred to the target device.

The preferred embodiment of the present invention, a method and system for searching through descriptive data in the AV/C protocol, is thus described. While the present invention has been described in particular embodiments, it should be appreciated that the present invention should not be construed as limited by such embodiments, but rather construed according to the below claims.

What is claimed is:

1. In a network of electronic devices having a target device containing stored data and a controller device, a method for performing a search comprising the steps of:

a) specifying a search criterion in a command structure;

b) transmitting said command structure from said controller device to said target device over a network interface, said target device recognizing a descriptor in said command structure as a request to perform a search of said stored data;

c) said target device performing said search of said stored data;

d) said target device identifying data on said target device that satisfies said search criterion and determining an identifier corresponding to said data that satisfies said search criterion; and e) transmitting a response containing said identifier from said target device to said controller device over said network interface.

2. The method of claim 1 further comprising the steps of:

f) said controller device accessing said data that satisfies said search criterion using said identifier; and g) transferring said data from said target device to said controller device over said network interface and wherein said network interface supports peer-to-peer communication.

3. The method of claim 2 wherein said step g) further comprises the step of transferring an object of media described by said data from said target device to said controller device over said network interface.

4. The method of claim 1 wherein said command structure comprises a code indicating data to search for, a code indicating a location of said data to search for, a start point within said location, and a response format for said identifier.

5. The method of claim 4 wherein said response format comprises an address for said data that satisfies said search criterion.

6. The method of claim 4 wherein said response format comprises a position of an object of media described by said data that satisfies said search criterion.

7. The method of claim 4 wherein said response format comprises an identifier of an object of media described by said data that satisfies said search criterion.

8. The method of claim 4 wherein said response format comprises a list containing an object of media described by said data that satisfies said search criterion.

9. The method of claim 4 wherein said response format comprises a type of list containing an object of media described by said data that satisfies said search criterion.

10. The method of claim 1 wherein said electronic devices are compliant with AV/C (audio visual control) protocol.

11. The method of claim 1 wherein said target device comprises a proxy device.

12. A system comprising:

a network interface;

a plurality of electronic devices coupled to said network interface including a target device containing stored data and a controller device; wherein said controller device is configured to specify a search criterion in a command structure;

wherein said controller device is also configured to transmit said command structure to said target device over said network interface;

wherein said target device is configured to recognize said command structure is indicating a request to perform a search of said stored data;

wherein said target device is also configured to execute said command structure to perform said search, configured to identify data on said target device that-satisfies said search criterion, and configured to generate an identifier corresponding to said data that satisfies said search criterion; and wherein said target device is also configured to transmit a response containing said identifier from said target device to said controller device over said network interface.

13. The system of claim 12 wherein said controller device is also configured to access said data that satisfies said search criterion using said identifier and configured to receive said data from said target device over said network interface and wherein said network interface supports peer-to-peer communication.

14. The system of claim 13 wherein said controller device is also configured to receive from said target device an object of media described by said data that satisfies said search criterion.

15. The system of claim 12 wherein said command structure comprises a code indicating data to search for, a code indicating a location of said data to search for, a start point within said location, and a response format for said identifier.

16. The system of claim 15 wherein said response format comprises an address for said data that satisfies said search criterion.

17. The system of claim 15 wherein said response format comprises an object of media described by said data that satisfies said search criterion.

18. The system of claim 15 wherein said response format comprises an identifier of said object of media described by said data that satisfies said search criterion.

19. The system of claim 15 wherein said response format comprises a list containing said object of media described by said data that satisfies said search criterion.

20. The system of claim 15 wherein said response format comprises a type of list containing said object of media described by said data that satisfies said search criterion.

21. The system of claim 12 wherein said controller device is configured to place a descriptor into a specified field of said command structure, said descriptor identifying said command structure as a request to perform said search.

22. The system of claim 12 wherein said electronic devices are compliant with AV/C (audio visual control) protocol and said network interface is compliant with the IEEE 1394 communication bus standard.

23. The system of claim 12 wherein said target device comprises a proxy device.

24. A system comprising:
a network interface;
a plurality of electronic devices coupled to said network interface including a target means containing stored data and a controller means;
wherein said controller means is for specifying a search criterion in a command structure;
wherein said controller means is for transmitting said command structure to said target means over said network interface;
wherein said target means is for recognizing said command structure is indicating a request to perform a search of said stored data;
wherein said target means is also for executing said command structure to perform said search, for identifying data on said target means that satisfies said search criterion, and for generating an identifier corresponding to said data that satisfies said search criterion; and
wherein said target means is also for transmitting a response containing said identifier from said target means to said controller means over said network interface.

25. The system of claim 24 wherein said controller means is also for accessing said data that satisfies said search criterion using said identifier and for retrieving said data from said target means over said network interface.

26. The system of claim 25 wherein said controller means is also for retrieving from said target means an object of media described by said data that satisfies said search criterion.

27. The system of claim 24 wherein said command structure comprises a code indicating data to search for, a code indicating a location of said data to search for, a start point Within said location, and a response format for said identifier.

28. The system of claim 24 wherein said controller means is for placing a descriptor into a specified field of said command structure, said descriptor identifying said command structure as a request to perform said search.

29. The system of claim 24 wherein said electronic devices are compliant with AV/C (audio visual control) protocol and said network interface is compliant with the IEEE 1394 communication bus standard.

30. The method of claim 1 wherein said network and network interface are substantially compliant with a version of the IEEE 1394 communication bus standard.

31. A system comprising:
a network interface supporting peer-to-peer communications;
a plurality of electronic devices coupled to said network interface including a target device containing stored data and a controller device;
wherein said controller device is configured to specify a search criterion in a command structure;
said controller device also configured to asynchronously transmit said command structure to said target device over said network interface;
said target device configured to recognize said command structure is indicating a request to perform a search of said stored data;
said target device also configured to execute said command structure to perform said search, configured to identify data on said target device that satisfies said search criterion, and configured to generate an identifier corresponding to said data that satisfies said search criterion; and
said target device also configured to transmit an isochronous response containing said identifier from said target device to said controller device over said network interface.

32. The system of claim 31 Wherein said controller device is also configured to access said data that satisfies said search criterion using said identifier and configured to receive said data from said target device over said network interface.

33. The system of claim 32 wherein said controller device is also configured to receive from said target device an object of media described by said data that satisfies said search criterion.

34. The system of claim 31 wherein said command structure comprises a code indicating data to search for, a code indicating a location of said data to search for, a start point within said location, and a response format for said identifier.

35. The system of claim 34 wherein said response format comprises an address for said data that satisfies said search criterion.

36. The system of claim 34 wherein said response format comprises an object of media described by said data that satisfies said search criterion.

37. The system of claim 34 wherein said response format comprises an identifier of said object of media described by said data that satisfies said search criterion.

38. The system of claim 34 wherein said response format comprises a list containing said object of media described by said data that satisfies said search criterion.

39. The system of claim 34 wherein said response format comprises a type of list containing said object of media described by said data that satisfies said search criterion.

40. The system of claim 31 wherein said controller device is configured to place a descriptor into a specified field of said command structure, said descriptor identifying said command structure as a request to perform said search.

41. The system of claim 31 wherein said electronic devices are compliant with AV/C (audio visual control) protocol and said network interface is compliant with the IEEE 1394 communication bus standard.

42. The system of claim 31 wherein said target device comprises a proxy device.

\* \* \* \* \*